(12) United States Patent
Gannamaneni et al.

(10) Patent No.: US 12,508,927 B2
(45) Date of Patent: Dec. 30, 2025

(54) CONVERTER SYSTEM FOR TRANSFERRING POWER

(71) Applicant: Volvo Car Corporation, Gothenburg (SE)

(72) Inventors: Narendar Rao Gannamaneni, Gothenburg (SE); Ali Dareini, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 632 days.

(21) Appl. No.: 17/964,098

(22) Filed: Oct. 12, 2022

(65) Prior Publication Data
US 2023/0121220 A1 Apr. 20, 2023

(30) Foreign Application Priority Data
Oct. 18, 2021 (EP) ..................................... 21203164

(51) Int. Cl.
*H02J 7/00* (2006.01)
*B60L 50/60* (2019.01)
(Continued)

(52) U.S. Cl.
CPC ............... *B60L 53/20* (2019.02); *B60L 50/66* (2019.02); *B60L 53/16* (2019.02);
(Continued)

(58) Field of Classification Search
CPC ...... B60L 53/20; B60L 53/16; B60L 2210/10; B60L 2210/30; B60L 2210/40; B60L 50/66
(Continued)

(56) References Cited

U.S. PATENT DOCUMENTS 5,666,040 A * 9/1997 Bourbeau ......... H01M 10/4257
320/147
6,507,506 B1 * 1/2003 Pinas ..................... B60L 3/0046
323/225
(Continued)

FOREIGN PATENT DOCUMENTS

| WO | 20210166750 A1 | 8/2021 | |
| WO | WO 2021166750 * | 8/2021 | ............... H02J 7/00 |
| WO | WO-2021166750 A1 * | 8/2021 | ............... H02J 7/00 |

OTHER PUBLICATIONS

Hirota WO 2021166750 (Year: 2021).*
Apr. 7, 2022 European Search Report issued in corresponding International Application No. 21203164.

*Primary Examiner* — Alexis B Pacheco
(74) *Attorney, Agent, or Firm* — Clements Bernard Walker; Christopher L. Bernard

(57) ABSTRACT

A converter system for transferring power, including a first high voltage DC-DC module, a second high voltage DC-DC module, and a controller. The high voltage DC-DC modules are electrically separated, the first high voltage DC-DC module is connected to a first high voltage interface of a high voltage system and to a first low voltage interface of a low voltage system, and being of a first DC-DC module type, and the second high voltage DC-DC module is connected to a second high voltage interface of the high voltage system and to a second low voltage interface of the low voltage system, and being of a second different DC-DC module type. The controller is configured to control power supply via one of the high voltage DC-DC modules to the low voltage system in case of failure affecting the other one of the high voltage DC-DC modules.

14 Claims, 4 Drawing Sheets

(51) Int. Cl.
  *B60L 53/16* (2019.01)
  *B60L 53/20* (2019.01)
  *H02J 7/14* (2006.01)
(52) U.S. Cl.
  CPC ....... *B60L 2210/10* (2013.01); *B60L 2210/30* (2013.01); *B60L 2220/40* (2013.01)
(58) Field of Classification Search
  USPC .......................................................... 320/134
  See application file for complete search history.

(56) References Cited

U.S. PATENT DOCUMENTS

| | | | | |
|---|---|---|---|---|
| 2012/0217797 A1* | 8/2012 | Butzmann | ............... | B60L 58/10 307/77 |
| 2016/0016479 A1* | 1/2016 | Khaligh | ............... | H02M 1/4258 336/170 |
| 2016/0023571 A1* | 1/2016 | Wu | ........................ | B60L 53/20 320/112 |
| 2016/0241028 A1* | 8/2016 | Long | .................... | H02J 7/0018 |
| 2016/0339795 A1* | 11/2016 | Fink | ......................... | H02J 7/34 |
| 2018/0219397 A1 | 8/2018 | Matsushita | | |
| 2018/0251036 A1* | 9/2018 | Tapadia | .................... | H02P 5/74 |
| 2019/0372465 A1* | 12/2019 | Xu | .................... | H02M 3/33571 |
| 2021/0061114 A1* | 3/2021 | Sun | ......................... | H02J 7/02 |
| 2021/0075331 A1* | 3/2021 | Tariq | ....................... | H02J 1/002 |
| 2021/0155100 A1* | 5/2021 | Khaligh | .................. | B60L 55/00 |
| 2021/0265855 A1* | 8/2021 | Pfeilschifter | ............ | B60L 53/14 |
| 2022/0093978 A1* | 3/2022 | Moon | ................. | H01M 10/441 |
| 2022/0385087 A1* | 12/2022 | Sarnago Andia | . | H02M 3/33584 |
| 2023/0134008 A1* | 5/2023 | Jabez Dhinagar | .... | H02J 7/0013 320/107 |
| 2023/0223840 A1* | 7/2023 | Zhu | .......................... | B60L 1/00 363/84 |
| 2025/0192367 A1* | 6/2025 | Park | .................... | H01M 50/497 |

* cited by examiner

CONVERTER SYSTEM FOR TRANSFERRING POWER

CROSS-REFERENCE TO RELATED APPLICATION

The present disclosure claims the benefit of priority of co-pending European Patent Application No. 21 203 164.5, filed on Oct. 18, 2021, and entitled "CONVERTER SYSTEM FOR TRANSFERRING POWER," the contents of which are incorporated in full by reference herein.

TECHNICAL FIELD

The present disclosure relates to a converter system for transferring power, to a method for controlling a converter system for transferring power, and to a vehicle including the converter system.

BACKGROUND

In electric vehicles, there are different power conversion modules, which are functional under different scenarios. For example, an on-board charger will convert AC to DC during charging to charge a high voltage battery and a traction inverter will convert DC to AC during driving to drive the vehicle. In both scenarios, either the on-board charger or the traction inverter is functional. However, to maintain a power supply to low voltage system loads, a DC-DC converter, which transfers power from a high voltage system to a low voltage system, must be functional under both scenarios.

The DC-DC converter is more stressed when compared to other power conversion modules. This makes design requirements of the DC-DC converter more complex. If the DC-DC converter fails during driving, some of vehicle functions supplied from the low voltage system could be at risk, particularly when a charge state on a low voltage battery is low.

SUMMARY

There may, therefore, be a need to improve a converter system in terms of stress tolerance.

According to a first aspect of the present disclosure, there is provided a converter system for transferring power, including a first high voltage DC-DC module, a second high voltage DC-DC module, and a controller. The first high voltage DC-DC module and the second high voltage DC-DC module are electrically separated from each other. The first high voltage DC-DC module is connected to a first high voltage interface of a high voltage system and to a first low voltage interface of a low voltage system. The second high voltage DC-DC module is connected to a second high voltage interface of the high voltage system and to a second low voltage interface of the low voltage system, and differs from the first high voltage DC-DC module in at least one hardware feature. The controller is configured to control power supply via one of the first high voltage DC-DC module and the second high voltage DC-DC module to the low voltage system in case of failure affecting the other one of the first high voltage DC-DC module and the second high voltage DC-DC module.

The converter system as described herein may reduce a risk of supplying power even though single point failures inside the first DC-DC module and the second DC-DC module. The converter system may still operate even in case of a malfunction of the first DC-DC module or second DC-DC module by providing power availability on the low voltage system. Accordingly, the converter system may maintain the battery systems and the power supply more efficiently. Moreover, a high safety integration of the converter system may be achieved. Further, there is a hardware diversity, at least in terms of the first and second DC-DC module.

As used herein, the first high voltage interface and the second high voltage interface may ensure a reliable coupling between the first high voltage DC-DC module and the high voltage system and between the second high voltage DC-DC module and the high voltage system respectively. The high voltage system may include one battery arrangement or unit or several battery arrangements units. The first high voltage interface and the second high voltage interface may be connected to the same battery unit or to different battery units. The first low voltage interface and the second low voltage interface may ensure a reliable coupling between the first DC-DC module and the low voltage system and between the second DC-DC module and the low voltage system respectively. The first low voltage interface and the second low voltage interface may be also connected to same low voltage system loads or to different low voltage system loads. The low voltage system loads may be control components for opening a door or a window to open, starting the motor, steering and braking loads etc.

As used herein, the first high voltage DC-DC module is connected to a first electrical path, and the second high voltage DC-DC module is connected to a second electrical path, in order to be electrically separated from each other.

Further, as used herein, the first high voltage DC-DC module and the second high voltage DC-DC module are connected directly across two series connected HV batteries which are designed to fulfil ASIL D safety goal together in order to provide half of the power to loads of the low voltage system in case of any single point of failure during driving of the vehicle. There are several outputs on each one of the first high voltage DC-DC module and second high voltage DC-DC module on low voltage side in series with switches, e.g. MOSFET, which act as a smart fuse or smart FET.

The first high voltage DC-DC module may be configured bidirectional to selectively supply power from the first high voltage interface to the first low voltage interface or vice versa. For example, the first high voltage DC-DC module is designed with a single stage power electronics topology which is intended to transfer power in both directions and regulates the LV output voltage in forward direction (HV to LV power transfer) and regulates the HV current in reverse direction (LV to HV power transfer).

The first high voltage DC-DC module may be configured single-stage and to regulate power supply to the second low voltage interface.

The second high voltage DC-DC module may be configured unidirectional to supply power from the second high voltage interface to the second low voltage interface.

The second high voltage DC-DC module may be configured multi-stage and including a first, regulator stage connected to the high voltage system and configured to regulate its output to a fixed value and a second, fixed-ratio stage connected to the regulator stage to be fed with the output of the regulator stage, and the controller may further be configured to control power supply via the second high voltage DC-DC module to the low voltage system in case of failure affecting the first high voltage DC-DC module.

The controller may further be configured to control the second high voltage DC-DC module to supply power to the low voltage system and to turn off power supply by the first high voltage DC-DC module in case of failure causing high voltage of the high voltage system to decrease. For example, the second high voltage DC-DC module may be a two-stage topology design with a front-end boost regulator as a first stage connected to the high voltage system. The output voltage of the boost regulator is a fixed voltage which is input to the second power stage. The second power stage is an unregulated DC-DC converter and provides power to the low voltage system loads. Both the power stages of the second high voltage DC-DC module are uni-directional hence the power is delivered to the low voltage loads from a battery in forward direction only. If there is a short circuit after the main contactors during driving scenario, the voltage of the high voltage system decreases to a low value depending on e.g. the contactor opening time or any pyro device or fuse opening. However, the first and/or second high voltage DC-DC module experiences the low voltage, for example <100 V, in the high voltage system for a duration of several tens of milliseconds (ms) until there is an open circuit in this short circuit current path. Since the first high voltage DC-DC module is a single stage design, if the high voltage system voltage decreases below a certain value the module is no longer able to regulate the low voltage side voltage. But the second high voltage DC-DC module frontend boost regulator is configured to regulate to a fixed value when the voltage is too low on the one side of the high voltage system. In this way, the second high voltage DC-DC module can provide power to the low voltage loads for a very wide high voltage range on high voltage system.

The converter system may include an AC-DC module being connected to a third high voltage interface and to a fourth high voltage interface of the high voltage system, being configured to supply power to the high voltage system, and being electrically separated from the first high voltage DC-DC module and the second high voltage DC-DC module. The AC-DC module may also be referred to as an on-board-charger, which is configured to charge a battery arrangement or system from an external AC power supply. The AC-DC module may be configured to stop charging if a failure regarding charging is detected.

The converter system further includes at least one high voltage contactor configured to selectively connect or disconnect the AC-DC module with the high voltage system via the respective third high voltage interface and/or fourth high voltage interface. Since the AC-DC module is placed outside the main contactors, the ASIL level for this converter during charging is ASIL A with a safety goal of stop charging.

The converter system may further include at least one low power DC-DC module being connected in parallel with one of the first high voltage DC-DC module and the second high voltage DC-DC module and configured to supply power to the low voltage system if the converter system or a parent system, e.g. a vehicle according to the second aspect below, including it is in a non-operating mode. For example, the at least one low power DC-DC module may be configured to provide less than 150 W of power to the key-off loads when the vehicle is in non-operating mode, such as a parking scenario. In other words, the converter system may be configured to operate at least one low power DC-DC module in a non-operating mode, e.g. a key-off state, parking condition of the vehicle, etc. The first and/or second low power DC-DC module may be a low power isolated DC-DC converter, which may be directly connected to the high voltage system and to the low voltage system. The first and/or second low power DC-DC unit may be configured to supply power, particularly to low voltage system loads such as core vehicle control units, opening a window or door. If the vehicle is for a longer period in a parking mode, the low voltage system may be in a deep discharge state and the vehicle may be completely shut down. The low power isolated DC-DC module may be turned on in the key off state of the vehicle and supply power to the low voltage system. Accordingly, a pre-defined state of charge of the low voltage system may be maintained and a complete shutdown of the vehicle may be avoided. Moreover, the DC-DC converter is turned off when the vehicle is in a non-operating state, i.e. key-off state. In conventional electric vehicles, a low voltage control unit relies on a low voltage battery supply. Accordingly, if the vehicle is parked for some months, the low voltage battery will be in deep discharge state and the vehicle may be completely shut down.

The converter system may further include a first low power DC-DC module being connected in parallel with the first high voltage DC-DC module and a second low power DC-DC module being connected in parallel with the second high voltage DC-DC module. Thereby, the first and/or second low power DC-DC module may be configured to supply power to the low voltage system if the converter system or a parent system, i.e. the vehicle of the second aspect, including it is in a non-operating mode. In other words, the converter system is configured to operate a first and/or second low power DC-DC module in a non-operating mode, e.g. a key-off state, parking condition of the vehicle, etc.

The second low power DC-DC module may be connected to the second high voltage DC-DC module via the second high voltage DC-DC module. In the non-operating mode, the second high voltage DC-DC module acts as a bypass.

In a second aspect, there is provided a vehicle. It includes an electric propulsion machine, and a converter system of the first aspect.

The vehicle may further include a charging port being connected to an AC-DC module of the converter system.

The vehicle may further include a first high voltage battery arrangement and a second high voltage battery arrangement together forming a high voltage system of the vehicle, the first high voltage battery arrangement being connected to a first high voltage interface and the second high voltage battery arrangement being connected to a second high voltage interface of the converter system.

According to a third aspect, there is provided a method for controlling a converter system. The method may be implemented in the converter system of the first aspect and/or the vehicle of second aspect. The method includes:
selectively connecting a high voltage system and a low voltage system with each other via a first high voltage DC-DC module and/or a second high voltage DC-DC module differing from the first high voltage DC-DC module in at least one hardware feature to control power supply from the high voltage system to the low voltage system;
the selectively connecting the high voltage system and the low voltage system with each other includes at least one of:
in case of non-failure operating mode, connecting the high voltage system and the low voltage system with each other via both the first high voltage DC-DC module and the second high voltage DC-DC module,
in case of a non-operating mode, connecting the high voltage system and the low voltage system with each other via at least one low power DC-DC module being connected in parallel with one of the first high voltage DC-DC module and the second high voltage DC-DC module, thereby bypassing the respective first high voltage DC-DC module or second high voltage DC-DC module, and in case of failure affecting one of the first high voltage DC-DC module and the second high voltage DC-DC module, connecting the high voltage system and the low voltage system with each other via the other, non-affected one of the first high voltage DC-DC module and the second high voltage DC-DC module.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., i.e. the above controller, which may also be a distributed computer system. The data processing means or the computer, respectively, may include one or more of a processor, a memory, a data interface, or the like.

It should be noted that the above embodiments may be combined with each other irrespective of the aspect involved. Accordingly, the method may be combined with structural features and, likewise, the apparatus and the system may be combined with features described above with regard to the method.

These and other aspects of the present disclosure will become apparent from and elucidated with reference to the embodiments described hereinafter.

BRIEF DESCRIPTION OF THE DRAWINGS

Exemplary aspects of the present disclosure will be described in the following with reference to the following drawings.

The figures are merely schematic representations and serve only to illustrate embodiments of the disclosure. Identical or equivalent elements are in principle provided with the same reference signs.

DESCRIPTION OF EMBODIMENTS

Figure 1:
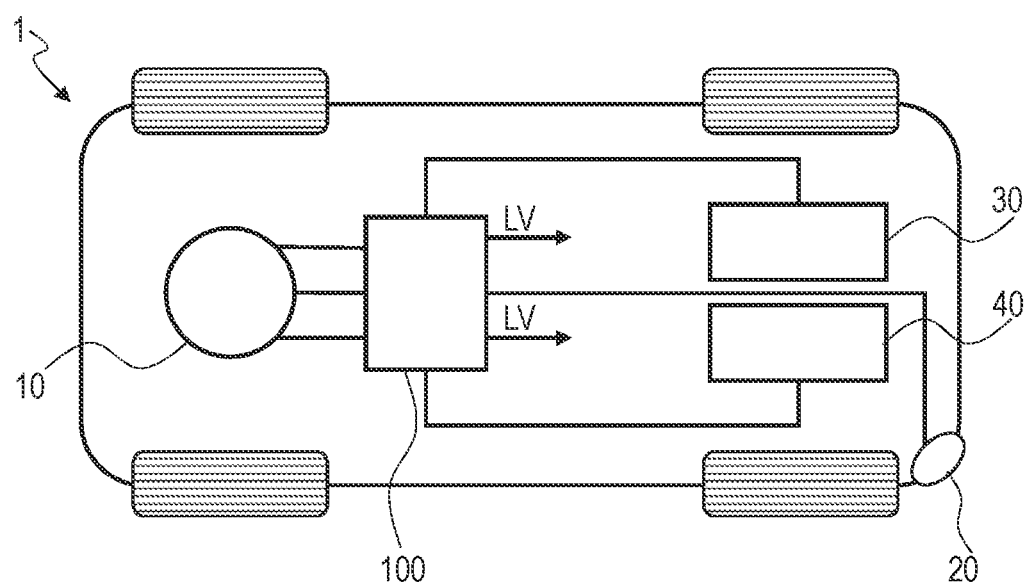
FIG. 1 shows in a schematic top view an electric vehicle including a converter system for transferring.

FIG. 1 shows in a schematic top view an electric vehicle 1. The vehicle 1 includes an electric propulsion machine 10, a charging port 20, a first high voltage battery arrangement 30, a second high voltage battery arrangement 40, and a converter system 100 for transferring power. The first high voltage battery arrangement 30 and the second high voltage battery arrangement 40 together form at least a part of a high voltage system of the vehicle 1. The charging port 20 is configured to be connected to an external power supply (not shown), for example via a charging cable, to charge the first high voltage battery arrangement 30 and/or the second high voltage battery arrangement 40. Further, the vehicle 1 includes a low voltage system, indicated in FIG. 1 by arrows LV. The high voltage (HV) system may have a voltage of 60 V<U≤1500 V, for example of about 200 V or 400V, and the low voltage (LV) system may have a voltage of <60 V, for example about 12 V, 24 V or 48 V, wherein this is not limited herein, provided that the high voltage system has a higher voltage than the low voltage system.

Figure 2:
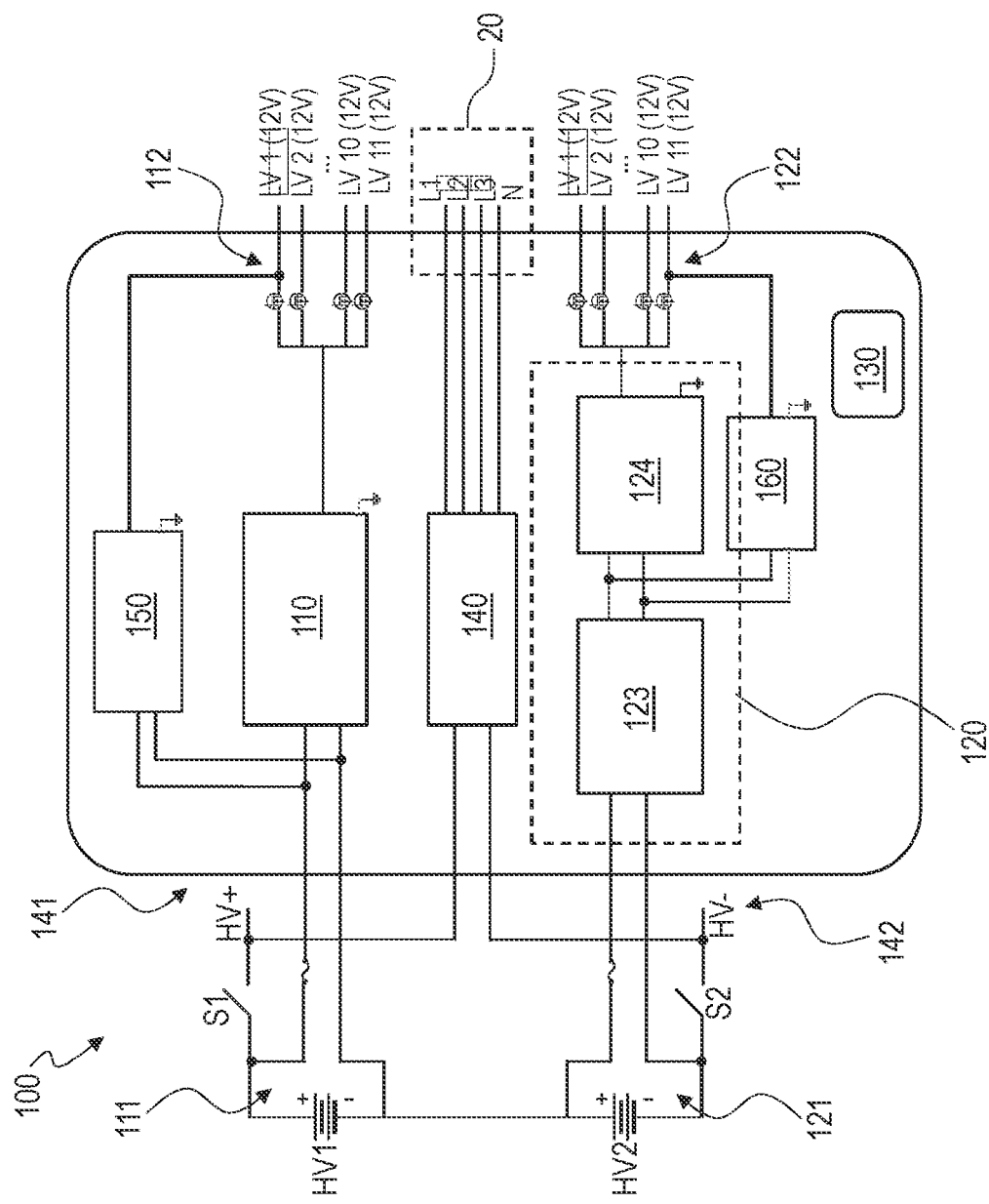
FIG. 2 shows in a block/circuit diagram a converter system for transferring power.

FIG. 2 shows in a block/circuit diagram the converter system 100. It is accommodated within a housing and forms an integral converter. The converter system 100 includes a first high voltage DC-DC module 110 and a second high voltage DC-DC module 120; and a controller 130. The first high voltage DC-DC module 110 and the second high voltage DC-DC module 120 are electrically separated from each other. The first high voltage DC-DC module 110 is connected to a first high voltage interface 111 of or to the high voltage system of the vehicle 1 and to a first low voltage interface 112 of or to the low voltage system of the vehicle 1. The second high voltage DC-DC module 120 is not identical to the first high voltage DC-DC module in terms of its hardware and is connected to a second high voltage interface 121 of or to the high voltage system and to a second low voltage interface 122 of or to the low voltage system.

The controller 130 may be a microcontroller or the like, wherein the controller 130 may be a single one or may include multiple controllers. It may be connected to an on-board communication system, such as a bus, e.g. CAN bus. Further, the controller 130 is configured to control power supply via one of the first high voltage DC-DC module 110 and the second high voltage DC-DC module 120 to the low voltage system in case of failure affecting the other one of the first high voltage DC-DC module 110 and the second high voltage DC-DC module 120. The failure may occur within the respective high-voltage DC-DC module or outside, for example within the converter system 100, the charging port 20, the first high voltage battery arrangement 30, the second high voltage battery arrangement 40 or within the vehicle 1. For example, the controller 130 is configured to control the second high voltage DC-DC module 120 to supply power to the low voltage system and to turn off power supply by the first high voltage DC-DC module 110 in case of failure causing high voltage of the high voltage system to decrease. For example, the failure may be a hardware component failure, a software control failure or a combination of both, or a short circuit, e.g. a high voltage short circuit, or other electrical failure.

The first high voltage DC-DC module 110 is configured bidirectional to selectively supply power from the first high voltage interface 111 to the first low voltage interface 112 or vice versa. Further, the first high voltage DC-DC module is configured single-stage and to regulate power supply to the first low voltage interface 112.

The second high voltage DC-DC module 120 is configured unidirectional to supply power from the second high voltage interface 121 to the second low voltage interface 122. Further, the second high voltage DC-DC module 120 is configured multi-stage. It includes a first, regulator stage 123 connected to the high voltage system and is configured to regulate its output to a fixed value. the second high voltage DC-DC module 120 further includes a second, fixed-ratio stage 124 that is connected to the regulator stage 123 to be fed with the output of the regulator stage 123.

From a functional perspective, the second high voltage DC-DC module 120 includes a two-stage topology design with a front-end boost regulator, i.e. the regulator stage, as a first stage connected to the second high voltage interface 122, e.g. HV 2 battery. The output voltage of the boost regulator, i.e. the regulator stage 123, is a fixed voltage which is input to the second power stage, i.e. fixed-ratio stage 124. The second power stage is an unregulated DC-DC converter and provides power to LV loads of the low voltage system. Thereby, the controller 130 is further configured to control power supply via the second high voltage DC-DC module 120 to the low voltage system in case of failure affecting the first high voltage DC-DC module, where in this may be an internal failure or may be external with respect to the first-high-voltage DC-DC module, such as an electrical failure, e.g. a short circuit or the like.

Further, the converter system 100 includes an AC-DC module 140, which is electrically separated from the first high voltage DC-DC module 110 and the second high voltage DC-DC module 120, as apparent from FIG. 2. It is connected to a third high voltage interface 141 and to a fourth high voltage interface 142 of or to the high voltage system. As indicated in FIG. 2 by L1, L2, L3, N, the Further, it is configured to supply power to the high voltage system via the charging port 20.

Further, the converter system 100 includes at least one high voltage contactor S1, S2, which is configured to selectively connect or disconnect the AC-DC module 140 with the high voltage system via the respective third high voltage interface 141 and/or fourth high voltage interface 142.

Still referring to FIG. 2, the converter system 100 further includes at least one low power DC-DC module 150, 160 that is connected in parallel with one of the first high voltage DC-DC module 110 and the second high voltage DC-DC module 120 and configured to supply power to the low voltage system if the converter system 100 or a parent system, e.g. the vehicle 1 or a part of it, including it is in a non-operating mode. It is noted that the vehicle 1 and/or the converter system 100 does not include any low voltage battery, e.g. 12 V or 24 V battery. The non-operating mode may also be referred to as key-off state of the vehicle 1. For example, the converter system 100 includes a first low power DC-DC module 150 that is connected in parallel with the first high voltage DC-DC module 110. Further, for example, the converter system 100 includes a second low power DC-DC module 160 that is connected in parallel with the second high voltage DC-DC module 120, and the first and/or second low power DC-DC module 150, 160 being configured to supply power to the low voltage system if the converter system 100 or a parent system, i.e. the vehicle 1, including it is in a non-operating mode. The second low power DC-DC module 160 is connected to the low voltage system via the second high voltage DC-DC module 120, which may act in a bypass mode.

Figure 3:
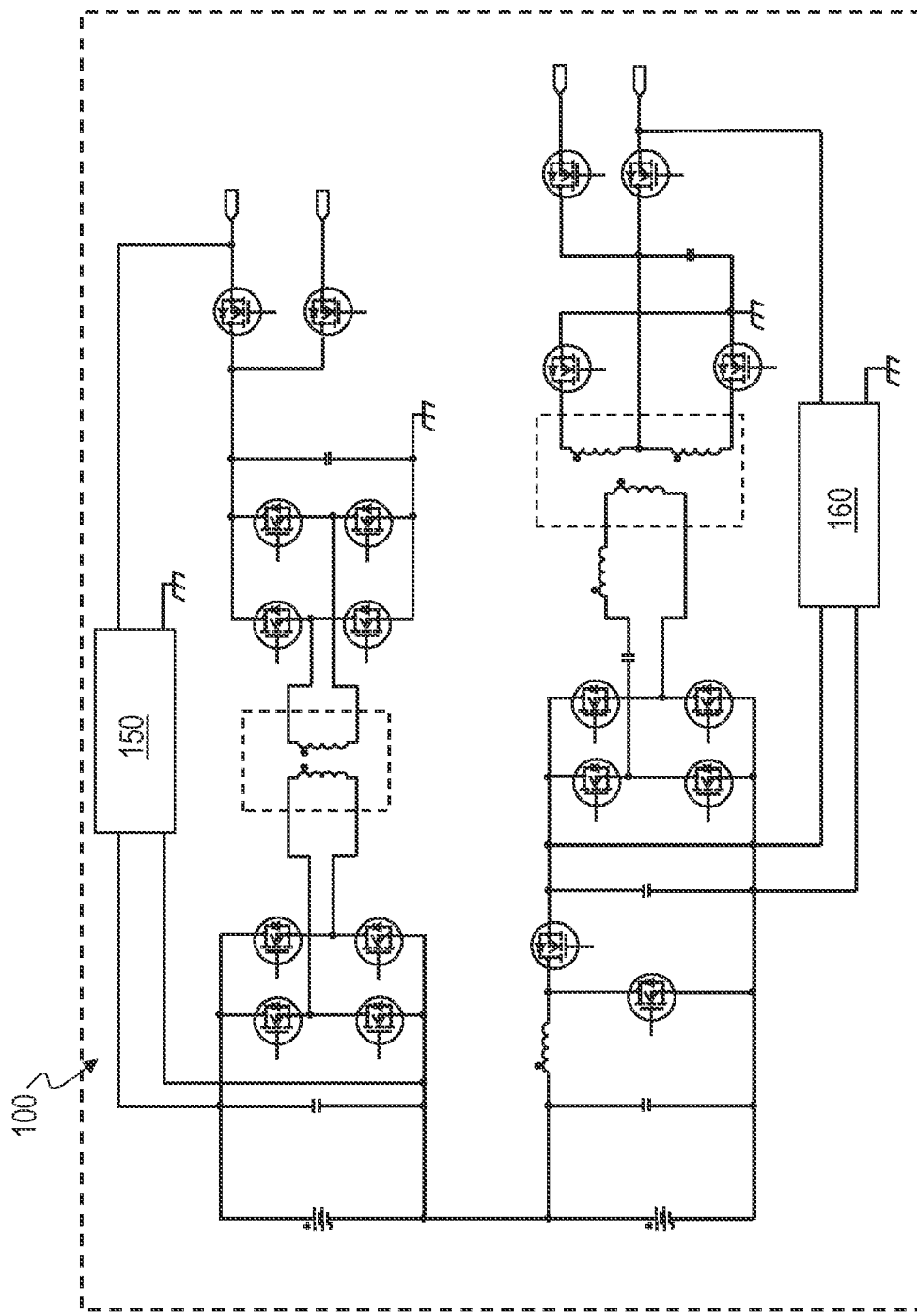
FIG. 3 shows in a block/circuit diagram a power conversion topology of a converter system for transferring power.

FIG. 3 shows in a block/circuit diagram a power conversion topology of the converter system 100. The topology of the first high voltage DC-DC module 110 is connected to HV1 battery and is a single stage phase shifted full bridge converter or a dual active bridge including two full bridge switches, e.g. a FET, MOSFET etc., on HV side & LV side respectively. The HV side full bridge includes a number of switches along with a capacitance before the bridge. Thereby, HV side full bridge high frequency AC terminals are connected to a high frequency transformer primary winding. The secondary winding of the transformer is connected to a LV full bridge that includes a number of low voltage switches, e.g. a FET, MOSFET, etc. A rectified output of LV full bridge is connected to switched LV outputs after a filter capacitor. The number of outputs shown in FIG. 3 is only exemplary, and is illustrated about but it can be higher or lower depending on the actual usage inside the vehicle 1. The series switches are controlled depending on a vehicle's mode. The first low power DC-DC module 150 is connected in parallel with the first high voltage DC-DC module 110. The topology of the first low power DC-DC module 150 may be a fly back, forward or a half bridge resonant DC-DC converter. The LV output of the first low power DC-DC module 150 is connected directly to the LV output's without any series switches. This means that the first low power DC-DC module 150 is configured to supply power to low voltage loads of the vehicle 1. The second high voltage DC-DC module 120 is connected to the HV2 battery with a two stage power conversion topology. The first stage which is a regulated boost converter, i.e. the first, regulator stage 123, is formed by an inductor, e.g. a coil, and connected switches. The input of the boost converter is filtered with a capacitor and the output of the boost regulator is connected to capacitor as a filter. The voltage across the capacitor is regulated to a fixed value independent of HV2 battery voltage and LV side load consumption. Since the voltage is regulated after the boost stage, the second stage can be an unregulated resonant converter for main DC-DC 1. The primary side of resonant converter includes a full bridge that includes a number of switches, e.g. FET, MOSFET, etc., and the AC terminals of the full bridge are connected to a primary winding of high frequency transformer with a series resonant network that includes a resonant capacitor and a resonant inductor. The high frequency transformer is a center tapped transformer with inductors having secondary windings having a common midpoint connection connected to LV outputs through series switches. The switches are controlled synchronously with respect to primary side full bridge switching. The rectified output of secondary windings is filtered through a capacitor and connected to LV outputs from through a series of switches, e.g. FET, MOSFET, etc., respectively. The resonant converter primary side can be a half bridge as well and it operated at with a fixed switching frequency close to resonant frequency. The second low power DC-DC module 160 is a regulated converter because when the vehicle is in a non-operating mode, such as a parking mode, key-off mode, or the like, the boost regulator stage of second low power DC-DC module 160 is disabled in order to reduce the power consumption. When the second high voltage DC-DC module 160 boost regulator is disabled, the HV voltage is directly applied to the low power DC-DC module 160 via a body diode of the corresponding switch, e.g. FET, MOSFET, etc. Then the second low power DC-DC module 160 regulates the LV side voltage. The topology of second low power DC-DC module 160 can be a fly back, forward or a half bridge resonant DC-DC converter. The output of the second low power DC-DC module 160 is also connected directly to the LV loads bypassing the series switches. Optionally, second low power DC-DC module 160 can also be a regulated converter in this architecture which can also improve the efficiency when the vehicle is in parking condition for example. In this case, the second low power DC-DC module 160 HV input is connected directly to HV2 battery.

Figure 4:
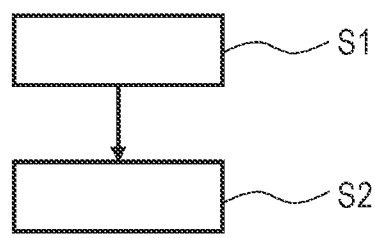
FIG. 4 shows in a flowchart a method for controlling a converter system.

FIG. 4 shows in a flow chart a method for controlling a converter system 100.

In a step S1, the method includes selectively connecting a high voltage system and a low voltage system with each other via a first high voltage DC-DC module 110 and/or a second high voltage DC-DC module 120 that differs in at least one hardware feature from the first high voltage DC-DC module 110 to control power supply from the high voltage system to the low voltage system.

In a step S2, the selectively connecting the high voltage system and the low voltage system considers the following scenarios.

In case of non-failure operating mode, the high voltage system and the low voltage system are connected with each other via both the first high voltage DC-DC module 110 and the second high voltage DC-DC module 120.

In case of a non-operating mode, e.g. if the vehicle 1 is parking, a key-off state, the high voltage system and the low voltage system are connected with each other via at least one low power DC-DC module 150, 160 that is connected in parallel with one of the first high voltage DC-DC module 110 and the second high voltage DC-DC module 120, thereby bypassing the respective first high voltage DC-DC module 110 or second high voltage DC-DC module 120.

In case of failure affecting one of the first high voltage DC-DC module 110 and the second high voltage DC-DC module 120, the high voltage system and the low voltage system are connected with each other via the other, non-affected one of the first high voltage DC-DC module 110 and the second high voltage DC-DC module 120.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A converter system for transferring power, comprising:
a first high voltage DC-DC module;
a second high voltage DC-DC module; and
a controller;
the first high voltage DC-DC module and the second high voltage DC-DC module being electrically separated from each other;
the first high voltage DC-DC module being connected to a first high voltage interface of a high voltage system and to a first low voltage interface of a low voltage system;
the second high voltage DC-DC module being connected to a second high voltage interface of the high voltage system and to a second low voltage interface of the low voltage system, and differing from the first high voltage DC-DC module in at least one hardware feature; and
the controller being configured to control power supply via one of the first high voltage DC-DC module and the second high voltage DC-DC module to the low voltage system in case of failure affecting the other one of the first high voltage DC-DC module and the second high voltage DC-DC module; and
an AC-DC module being connected to a third high voltage interface and to a fourth high voltage interface of the high voltage system, being configured to supply power to the high voltage system, and being electrically separated from the first high voltage DC-DC module and the second high voltage DC-DC module.

2. The converter system of claim 1, the first high voltage DC-DC module being configured bidirectional to selectively supply power from the first high voltage interface to the first low voltage interface or vice versa.

3. The converter system of claim 1, the first high voltage DC-DC module being configured single-stage and to regulate power supply to the first low voltage interface.

4. The converter system of claim 1, the second high voltage DC-DC module being configured unidirectional to supply power from the second high voltage interface to the second low voltage interface.

5. The converter system of claim 1, the second high voltage DC-DC module being configured multi-stage and comprising a first regulator stage connected to the high voltage system and configured to regulate its output to a fixed value and a second, fixed-ratio stage connected to the regulator stage to be fed with the output of the regulator stage, and the controller being further configured to control power supply via the second high voltage DC-DC module to the low voltage system in case of failure affecting the first high voltage DC-DC module.

6. The converter system of claim 1, the controller being further configured to control the second high voltage DC-DC module to supply power to the low voltage system and to turn off power supply by the first high voltage DC-DC module in case of failure causing high voltage of the high voltage system to decrease.

7. The converter system of claim 1, further comprising at least one high voltage contactor configured to selectively connect or disconnect the AC-DC module with the high voltage system via the respective third high voltage interface and/or fourth high voltage interface.

8. The converter system of claim 1, further comprising at least one low power DC-DC module being connected in parallel with one of the first high voltage DC-DC module and the second high voltage DC-DC module and configured to supply power to the low voltage system if the converter system or a parent system comprising it is in a non-operating mode.

9. The converter system of claim 1, further comprising a first low power DC-DC module being connected in parallel with the first high voltage DC-DC module and a second low power DC-DC module being connected in parallel with the second high voltage DC-DC module, and one of the first and second low power DC-DC module being configured to supply power to the low voltage system if the converter system or a parent system comprising it is in a non-operating mode.

10. The converter system of claim 9, the second low power DC-DC module being connected to the low voltage system via the second high voltage DC-DC module.

11. A vehicle comprising an electric propulsion machine and the converter system of claim 1.

12. The vehicle of claim 11, further comprising a charging port being connected to the AC-DC module of the converter system.

13. The vehicle of claim 11, further comprising a first high voltage battery arrangement and a second high voltage battery arrangement together forming a high voltage system of the vehicle, the first high voltage battery arrangement being connected to a first high voltage interface and the second high voltage battery arrangement being connected to a second high voltage interface of the converter system.

14. A method for controlling a converter system, comprising:
selectively connecting a high voltage system and a low voltage system with each other via at least one of a first high voltage DC-DC module of a first type and a second high voltage DC-DC module of a second type different to the first type to control power supply from the high voltage system to the low voltage system;

the selectively connecting the high voltage system and the low voltage system with each other comprises at least one of:

in case of non-failure operating mode, connecting the high voltage system and the low voltage system with each other via both the first high voltage DC-DC module and the second high voltage DC-DC module, in case of a non-operating mode, connecting the high voltage system and the low voltage system with each other via at least one low power DC-DC module being connected in parallel with one of the first high voltage DC-DC module and the second high voltage DC-DC module, thereby bypassing the respective first high voltage DC-DC module or second high voltage DC-DC module, and in case of failure affecting one of the first high voltage DC-DC module and the second high voltage DC-DC module, connecting the high voltage system and the low voltage system with each other via the other, non-affected one of the first high voltage DC-DC module and the second high voltage DC-DC module; and selectively connecting an AC-DC module to the high voltage system, being configured to supply power to the high voltage system, and being electrically separated from the first high voltage DC-DC module and the second high voltage DC-DC module.

\* \* \* \* \*